US006799096B1

(12) United States Patent
Franke et al.

(10) Patent No.: US 6,799,096 B1
(45) Date of Patent: Sep. 28, 2004

(54) METHOD FOR OPTIMIZING ENERGY IN A VEHICLE/TRAIN WITH MULTIPLE DRIVE UNITS

(75) Inventors: Rudiger Franke, Heidelberg (DE); Peter Terwiesch, Wohlenschwiel (CH); Markus Meyer, Ebikon (CH); Christian Klose, Brandenburg a.d. Havel (DE); Karl-Hermann Ketteler, Kleindoltingen (CH)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 10/031,977

(22) PCT Filed: Jul. 26, 2000

(86) PCT No.: PCT/EP00/07151

§ 371 (c)(1),
(2), (4) Date: Sep. 9, 2002

(87) PCT Pub. No.: WO01/08958

PCT Pub. Date: Feb. 8, 2001

(30) Foreign Application Priority Data

Jul. 29, 1999 (DE) .......................................... 199 35 353

(51) Int. Cl.[7] .......................... B60K 41/00; B60L 11/00; G05D 13/58
(52) U.S. Cl. ............................. 701/19; 701/54; 318/143
(58) Field of Search ............................. 701/19, 54, 61, 701/117, 102, 53, 99; 318/143, 148; 180/65.3, 65.4, 146, 306, 65.2

(56) References Cited

U.S. PATENT DOCUMENTS

| | | | | | |
|---|---|---|---|---|---|
| 4,866,622 | A | * | 9/1989 | Dreher et al. .......... | 364/431.04 |
| 5,440,489 | A | * | 8/1995 | Newman ................ | 364/426.05 |
| 5,788,004 | A | * | 8/1998 | Friedmann et al. ........ | 180/65.2 |
| 5,789,882 | A | * | 8/1998 | Ibaraki et al. ............... | 318/148 |
| 6,167,339 | A | * | 12/2000 | Pels ............................ | 701/54 |

FOREIGN PATENT DOCUMENTS

| | | |
|---|---|---|
| DE | 129 761 A | 2/1978 |
| DE | 208 324 A | 5/1984 |
| DE | 236 705 A | 6/1986 |
| DE | 255 132 A | 3/1988 |
| DE | 262 836 A | 12/1988 |
| DE | 266 539 A | 4/1989 |
| DE | 197 26 542 A | 11/1998 |
| EP | 0 467 377 B | 1/1992 |
| EP | 0 755 840 A | 1/1997 |

* cited by examiner

Primary Examiner—Tan Q. Nguyen
Assistant Examiner—Dalena Tran
(74) Attorney, Agent, or Firm—Howrey Simon Arnold & White; Jacobus C. Rasser; David P. Owen

(57) ABSTRACT

A method for power optimization in a vehicle/train, using time reserves which are included when planning a schedule, is proposed. In order to achieve a power-saving travel mode with the aid of an optimization algorithm, the presence of a number of completely or partially autonomous drive systems is taken into account, the separate functions of efficiency or power loss of each drive system being taken into consideration.

18 Claims, 1 Drawing Sheet

METHOD FOR OPTIMIZING ENERGY IN A VEHICLE/TRAIN WITH MULTIPLE DRIVE UNITS

BACKGROUND OF THE INVENTION

1. Field of the Invention

The invention relates to a method for power optimization in a vehicle/train according to the preamble of claim 1.

2. Description of the Related Art

During the planning of journeys and the drafting of schedules for rail traffic, time reserves for unforeseen events and adverse operating conditions are included in the plans. Since, during real journeys, the operating conditions are typically more favorable than those assumed during planning, the time reserves created by this are available for other purposes. A particularly practical use of the time reserves resides in the saving of power by means of a suitable travel mode.

Previously known and used methods for power minimization are mostly based on the assumption that a travel mode comprising the constituents maximum acceleration—travel at constant speed—coasting—maximum retardation is optimum in power terms. In this case, the mechanical tractive power which is needed to accelerate the vehicle is minimized. For verification, a linear dynamic train model is used, in particular no account being taken of any term which describes the quadratic relationship between speed and travel resistance.

In DD 255 132 A1, this basic assumption is expanded by subdividing a total route into a number of sections, so that in each section the slope resistance of the journey is constant.

In EP 0 467 377 B1, the subdivision of the overall route into a number of sections is introduced in such a way that in each section the permissible maximum speed is constant. The travel mode comprising the constituents maximum acceleration—travel at constant speed—maximum retardation is repeated in each section. Coasting is therefore dispensed with.

EP 0 755 840 A1 does not describe a practical method for power optimization but instead explains a general system structure with which power optimization can also be implemented. A cycle comprising acceleration—travel at constant speed—retardation and braking is listed as an example.

BRIEF SUMMARY OF THE INVENTION

The invention is based on the object of specifying an improved method for power optimization with regard to the time reserves included in the planning of a schedule of a vehicle/train.

This object is achieved, in conjunction with the preamble, by the features specified in claim 1.

The advantage that can be achieved with the invention is in particular that, by taking into account the distribution of the drive equipment and multiple traction in the optimization algorithm, instead of the mechanical tractive power the power which is primarily used, such as the electrical power in the case of electric rail vehicles, is minimized.

Advantageous refinements of the invention are identified in the subclaims.

Further advantages of the proposed method emerge from the following description.

BRIEF DESCRIPTION OF THE DRAWINGS

The invention will be explained in more detail below using the exemplary embodiments that are illustrated in the drawings and in which.

DESCRIPTION OF ILLUSTRATIVE EMBODIMENTS

Figure 1:
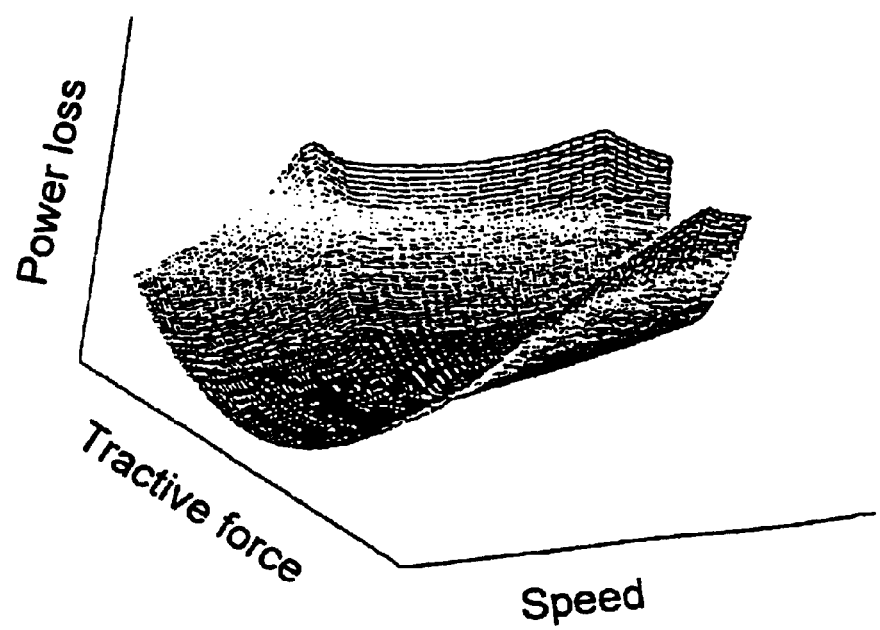
FIG. 1 shows a characteristic map of the power loss of a typical electric locomotive.

The nub of the invention is to be seen in the fact that the distribution of the drive equipment and the multiple traction are taken into account in the optimization problem with regard to the time reserves included in the planning of a schedule of a vehicle/train. Here, the problem of power minimization is formulated as a mathematical optimization problem and solved by a suitable, generally known optimization algorithm.

Suitable optimization algorithms are known, for example, from Papageorgiou: Optimierung [Optimization], Chapters 10, 19 and in particular 20, Oldenbourg Verlag, 1996.

Accordingly, it is assumed that more than one autonomous drive system is available in order to provide the total drive power of a vehicle/train. For example, a typical electric locomotive normally has two bogies, each of which is equipped with separate drives. In addition, designs with three bogies with separate drives are known, as are bogie-less vehicles with two or more driven axles.

In the case of simple traction, in which only one traction vehicle performs the transport, the number of possible separate and autonomous drive systems depends on the circuit topology of the traction vehicle. In the case of electric locomotives, the circuit topology comprises, for example, in addition to the actual drives (motors), -primarily further components of the high-voltage equipment and auxiliary equipment, so-called drive components. In the case of multiple traction, at least two traction vehicles in the composite train are involved in the transport of the train. Likewise, a number of concentrated or distributed drive units can be integrated into one drive train. Here, too, the circuit topology and the number of drive trains coupled in the composite train decide the number of possible separate and autonomous drive systems.

According to the invention, provision is made to take into account a number of completely or partially autonomous drive systems for power minimization with regard to the time reserves included in the planning of a schedule of a vehicle/train, it being possible for each of the drive systems to be characterized using separate functions of efficiency or power loss. When including the distribution of the drive equipment and multiple traction, three procedures are proposed, which can be used individually or in combination.

According to a first procedure, the functions of efficiency or of power loss of the individual autonomous drive systems are combined during preprocessing to form an overall function of the efficiency or the power loss of the vehicle/train. Further optimization is then identical with the optimization for a concentrated system, that is to say a system having only one single autonomous drive system.

According to a second procedure, a representative function (average function) of efficiency or power loss of an autonomous drive system is taken into account in the optimization together with the number of autonomous drive systems respectively used. This procedure is particularly expedient if the efficiency or power loss of the autonomous drive systems do not differ excessively from one another.

According to a third procedure, for each autonomous drive system, a function of efficiency or power loss and the binary state information ON or OFF (that is to say the actions of switching the individual autonomous drive systems on/off) are taken into account in the optimization. This procedure is particularly expedient if the efficiency or power loss of the autonomous drive systems are different to a greater extent.

While, in the case of the third procedure, there is already a plan of use for each individual autonomous drive system in the result of the optimization, in the case of the first two procedures, this has to be drawn up further through post-processing.

By taking into account the distribution of autonomous drive systems, the optimum combination of the individual drives can be determined for each traveling situation and set in a predictive way. At the same time, boundary conditions, such as the tractive and braking forces to be expected, adhesion coefficient, temperatures in the drive components and time influences in the drive dynamics, are taken into account. Furthermore, switching-on and switching-off losses can be minimized, whilst simultaneously taking into account the further losses of the vehicle.

FIG. 1 shows a characteristic map of the power loss as a function of the tractive force and the speed of a drive system of a typical electric locomotive.

Figure 2:
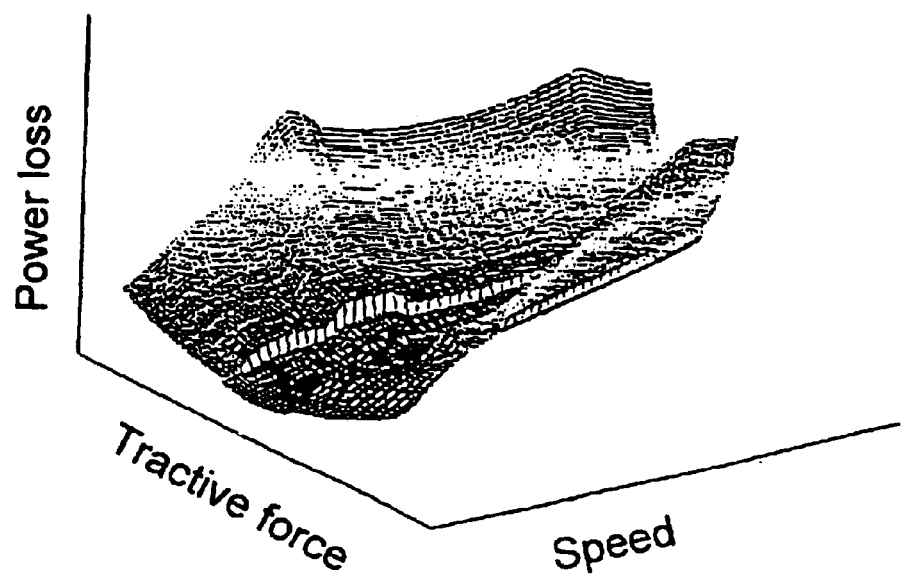
FIG. 2 shows a characteristic map of the power loss of a typical electric locomotive with two separately controlled drive systems.

FIG. 2 shows a characteristic map, put together to accord with the first procedure, of the power loss (overall function) as a function of the tractive force and the speed of a typical electric locomotive, including switching off an autonomous drive system of a bogie in the lower output range.

What is claimed is:

1. A method for power optimization for a rail vehicle traveling over a route according to a schedule which includes a time reserve, the rail vehicle comprising a plurality of completely or partially autonomous drive systems, the method comprising:

identifying at least two completely or partially autonomous drive systems in the rail vehicle;

determining efficiency of each identified autonomous drive system; and determining a power-saving travel mode for the rail vehicle using an optimization algorithm in which the efficiency of the identified autonomous drive systems is taken into consideration.

2. The method as claimed in claims 1, wherein the autonomous drive systems comprise one or more drive systems from the group consisting of bogies with a separate drive and driven axles.

3. The method as claimed in claim 1, wherein efficiency for each identified autonomous drive system is determined as a function of tractive force and vehicle speed.

4. The method as claimed in claim 3, wherein the step of determining a power saving mode comprises combining the functions of efficiency of each identified autonomous drive system to form an overall function of efficiency for the rail vehicle for use in the optimization algorithm.

5. The method as claimed in claim 3, wherein the step of determining a power saving mode comprises:

combining the functions of efficiency of each identified autonomous drive system to form a representative function of efficiency for the rail vehicle;

determining the number of autonomous drive systems in the rail vehicle; and determining efficiency on the basis of the representative function of efficiency and the number of autonomous drive systems in the optimization algorithm.

6. The method as claimed in claim 3 further comprises determining an on/off state for each autonomous drive system and wherein the efficiency of the identified autonomous drive systems and their respective on/off states is taken into consideration in the optimization algorithm to determine a power saving mode.

7. The method as claimed in claim 1, wherein autonomous drive systems are identified by taking boundary conditions into account, the boundary conditions consisting of one or more conditions taken from the group comprising expected tractive force, expected braking force, adhesion coefficients, temperature, and influences in the drive dynamics.

8. The method as claimed in claim 1, further comprising determining an optimum combination of the autonomous drive systems for use while travelling over the route.

9. The method as claimed in claim 1, wherein the plurality of completely or partially autonomous drive systems are electric drive systems.

10. A method for power optimization for a rail vehicle traveling over a route according to a schedule which includes a time reserve, the rail vehicle comprising a plurality of completely or partially autonomous drive systems, the method comprising:

identifying at least two completely or partially autonomous drive systems in the rail vehicle;

determining power loss of each identified autonomous drive system; and determining a power-saving travel mode for the rail vehicle using an optimization algorithm in which the power loss of the identified autonomous drive systems is taken into consideration.

11. The method as claimed in claim 10, wherein the autonomous drive systems comprise one or more drive systems from the group consisting of bogies with a separate drive and driven axles.

12. The method as claimed in claim 10, wherein power loss for each identified autonomous drive system is determined as a function of tractive force and vehicle speed.

13. The method as claimed in claim 12, wherein the step of determining a power saving mode comprises combining the functions of power loss of each identified autonomous drive system to form an overall function of power loss for the rail vehicle for use in the optimization algorithm.

14. The method as claimed in claim 12, wherein the step of determining a power saving mode comprises:

combining the functions of power loss of each identified autonomous drive system to form a representative function of power loss for them vehicle;

determining the number of autonomous drive systems in the rail vehicle; and determining power loss on the basis of the representative function of power loss and the number of autonomous drive systems in the optimization algorithm.

15. The method as claimed in claim 12, further comprises determining an on/off state for each autonomous drive system and wherein the power loss of the identified autonomous drive systems and their respective on/off states is taken into consideration in the optimization algorithm to determine a power saving mode.

16. The method as claimed in claim 10, wherein autonomous drive systems are identified by taking boundary conditions into account, the boundary conditions consisting of one or more conditions taken from the group comprising expected tractive force, expected braking force, adhesion coefficients, temperature, and influences in the drive dynamics.

17. The method as claimed in claim 10, further comprising determining an optimum combination of the autonomous drive systems for use while travelling over the route.

18. The method as claimed in claim 10, wherein the plurality of completely or partially autonomous drive systems are electric drive systems.

* * * * *